Figure 1:
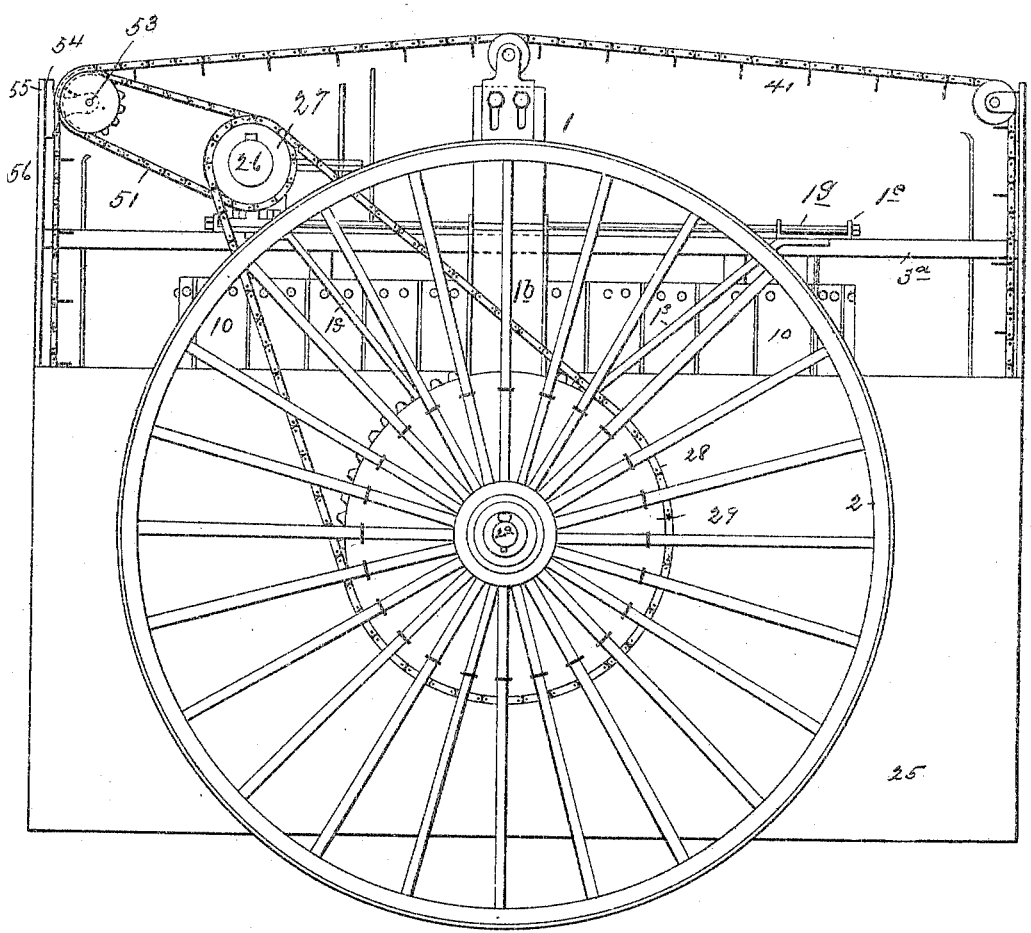

No. 783,792. PATENTED FEB. 28, 1905.
G. LISPENARD.
COTTON HARVESTER.
APPLICATION FILED JUNE 24, 1898.

14 SHEETS—SHEET 1.

WITNESSES:
INVENTOR
George Lispenard
BY
ATTORNEY

No. 783,792. PATENTED FEB. 28, 1905.
G. LISPENARD.
COTTON HARVESTER.
APPLICATION FILED JUNE 24, 1898.

14 SHEETS—SHEET 5.

WITNESSES:

INVENTOR
George Lispenard
BY
ATTORNEY

No. 783,792. PATENTED FEB. 28, 1905.
G. LISPENARD.
COTTON HARVESTER.
APPLICATION FILED JUNE 24, 1898.

14 SHEETS—SHEET 7.

Witnesses,
C. W. Benjamin

Inventor,
George Lispenard
by Joseph L. Levy
atty

No. 783,792. PATENTED FEB. 28, 1905.
G. LISPENARD.
COTTON HARVESTER.
APPLICATION FILED JUNE 24, 1898.
14 SHEETS—SHEET 8.
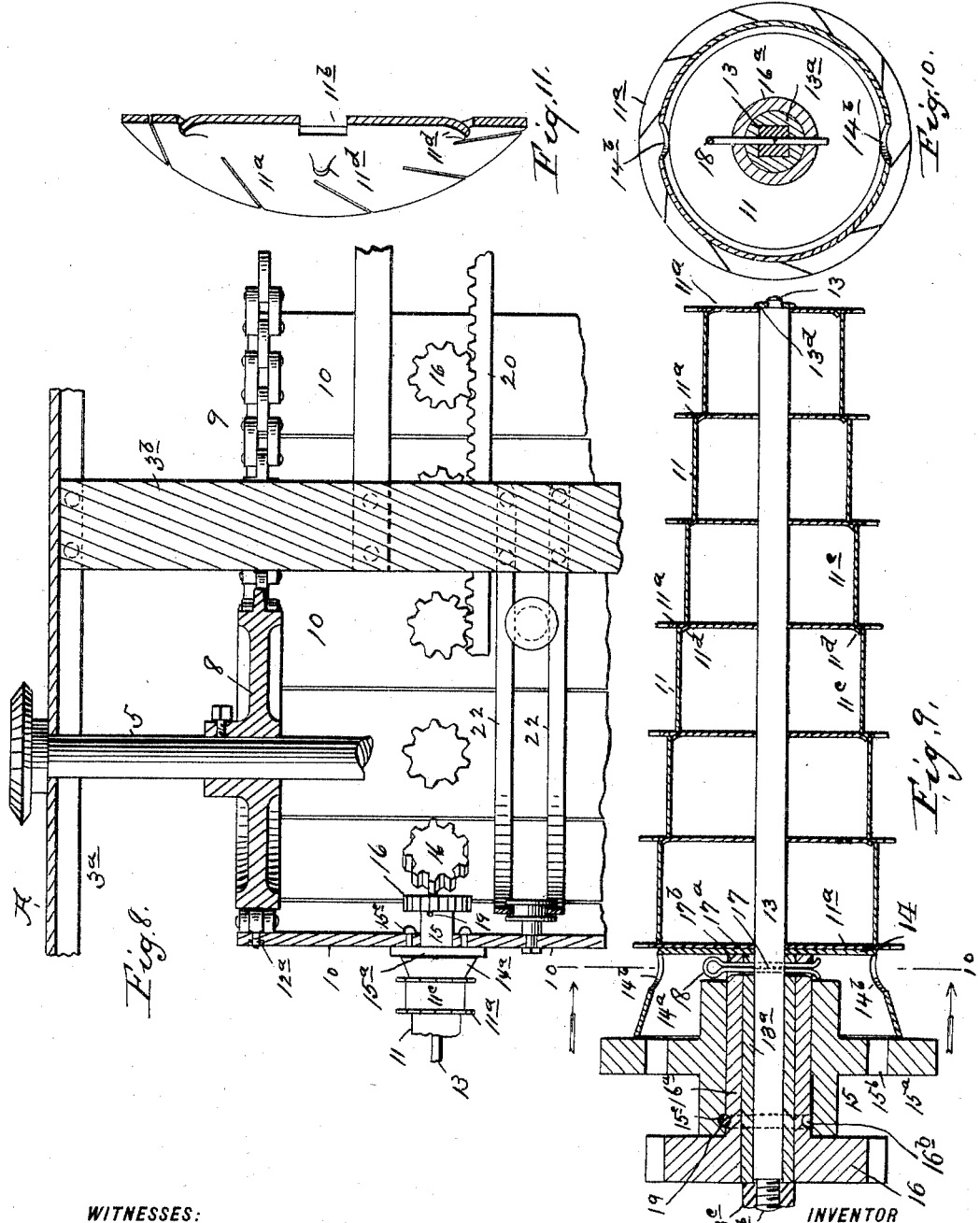

No. 783,792. PATENTED FEB. 28, 1905.
G. LISPENARD.
COTTON HARVESTER.
APPLICATION FILED JUNE 24, 1898.
14 SHEETS—SHEET 9.
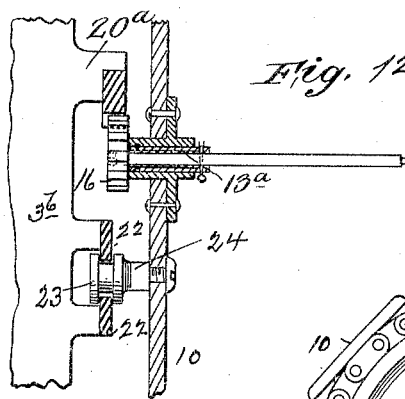
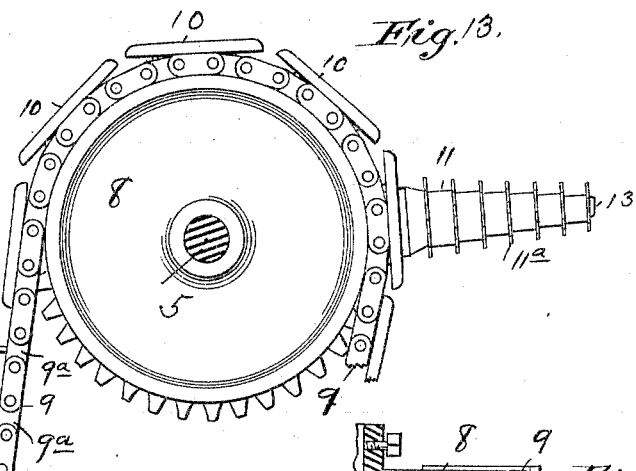
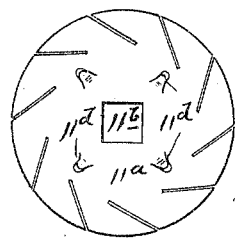
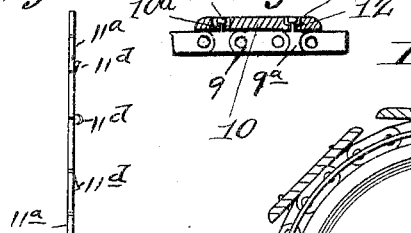
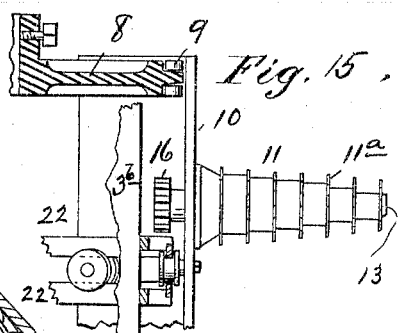
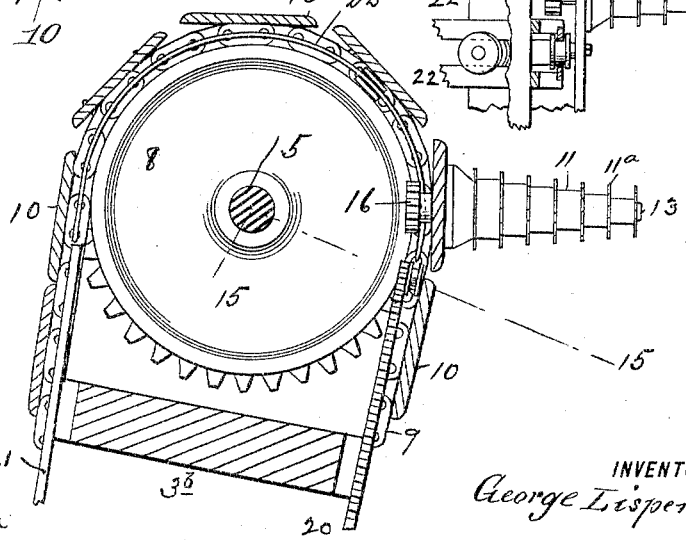
WITNESSES:
INVENTOR
George Lispenard
BY
ATTORNEY No. 783,792. PATENTED FEB. 28, 1905.
G. LISPENARD.
COTTON HARVESTER.
APPLICATION FILED JUNE 24, 1898.

14 SHEETS—SHEET 10.

Attest
C. W. Benjamin
Wm Jacobsen

Inventor
George Lispenard
by Joseph R. Levy
his ATTORNEY

No. 783,792. PATENTED FEB. 28, 1905.
G. LISPENARD.
COTTON HARVESTER.
APPLICATION FILED JUNE 24, 1898.

14 SHEETS—SHEET 11.

WITNESSES
C. W. Benjamin
Wm Jacobsen

INVENTOR
George Lispenard
BY
Joseph L. Levy
ATTORNEY

No. 783,792. PATENTED FEB. 28, 1905.
G. LISPENARD.
COTTON HARVESTER.
APPLICATION FILED JUNE 24, 1898.

14 SHEETS—SHEET 12.

WITNESS:

INVENTOR
George Lispenard
BY
ATTORNEY

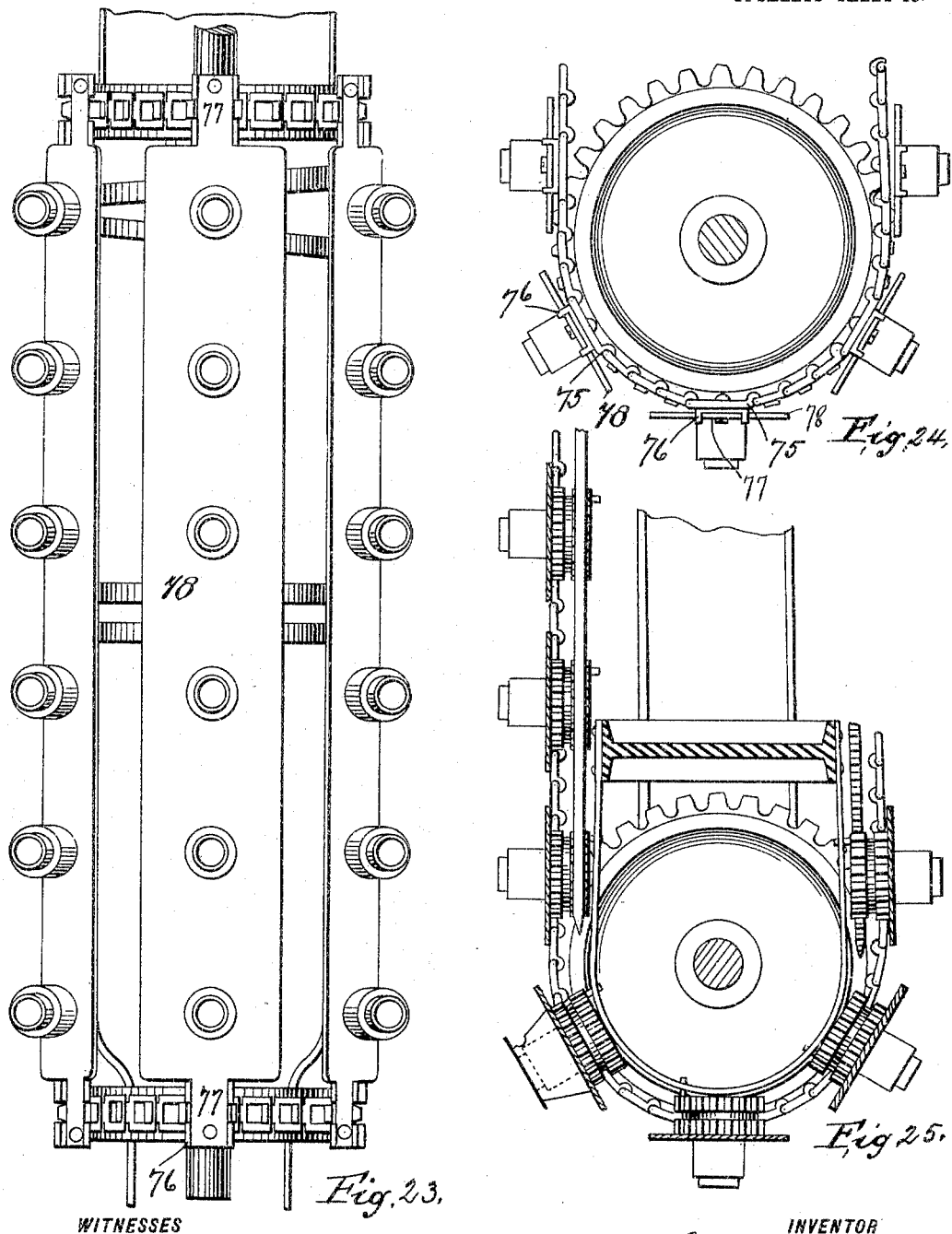

No. 783,792. PATENTED FEB. 28, 1905.
G. LISPENARD.
COTTON HARVESTER.
APPLICATION FILED JUNE 24, 1898.

14 SHEETS—SHEET 14.

WITNESSES
C. W. Benjamin
Wm Jacobs

INVENTOR
George Lispenard
BY Joseph L. Levy
ATTORNEY

No. 783,792. Patented February 28, 1905.

UNITED STATES PATENT OFFICE.

GEORGE LISPENARD, OF BROOKLYN, NEW YORK, ASSIGNOR TO SOLOMON K. LICHTENSTEIN, TRUSTEE, OF NEW YORK, N. Y.

COTTON-HARVESTER.

SPECIFICATION forming part of Letters Patent No. 783,792, dated February 28, 1905.

Application filed June 24, 1898. Serial No. 684,432.

*To all whom it may concern:*

Be it known that I, GEORGE LISPENARD, a citizen of the United States, residing at the city of Brooklyn, county of Kings, and State of New York, have invented certain new and useful Improvements in Cotton-Harvesters, of which the following is a specification.

My invention relates to improvements in the class of cotton-harvesters in which a main frame carried on suitable wheels is provided with endless traveling picker-carriers, which carriers support rotative picker stems or hackles between which the cotton-bushes are received as the machine travels along the rows of bushes.

One object of the invention is to provide improvements in the main and auxiliary frames of the harvester whereby the operative part of the machine can be properly carried and certain useful adjustments can be made.

Another object of the invention is to provide improved means for supporting and operating the picker stems or hackles, so that their endless carriers will have proper support at all points. This portion of the invention embraces a novel arrangement of the parts whereby when the rotating picker-stems are in contact with the bushes said stems will be drawn laterally of the bushes to cause more perfect picking of the cotton from the bolls. Furthermore, the arrangement is such that the cotton-bushes will first be met by a body or wall of closely-intermingled picker-stems which gradually separate as the bush is passed, whereby the bush is gradually released from the action of the picker-stems to reduce injury to the bush and to the unripe cotton-bolls.

A further object of the invention is to provide an improved construction of picker-stems whereby guards are provided close to the hackle-teeth to prevent sticks, &c., from being carried away with the picked cotton. The arrangement is such, also, that the picker or hackle saws or teeth can be readily removed or replaced in the picker-stem and also so that the stems can be readily removed from or adjusted on their supporting-bars in various positions to enable ripe cotton to be picked according to its position on the bushes without operating on unripe cotton.

Furthermore, the invention consists in the novel details of improvement and the combinations of parts that will be more fully hereinafter set forth and then pointed out in the claims.

Reference is to be had to the accompanying drawings, forming part hereof, wherein—

Figure 2:
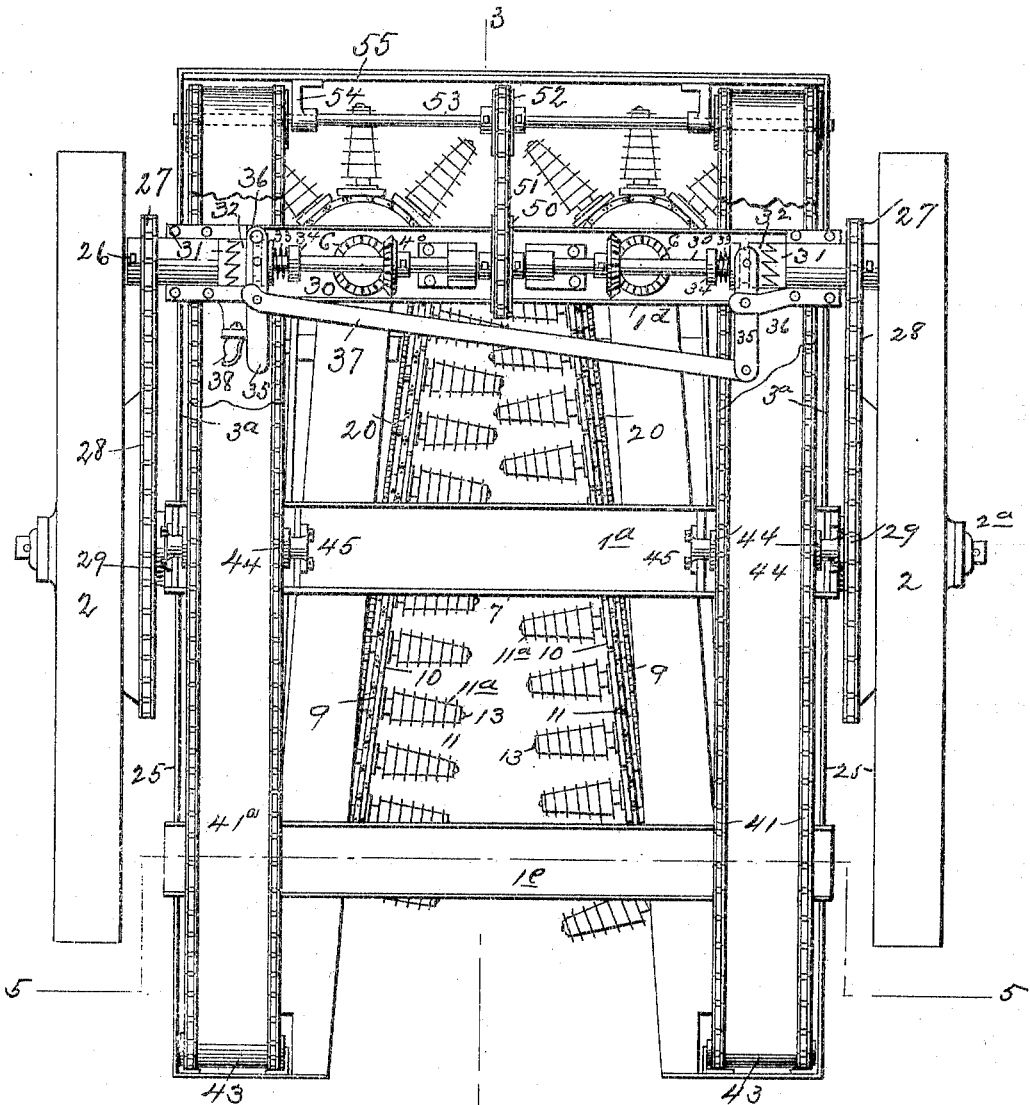
Figure 3:
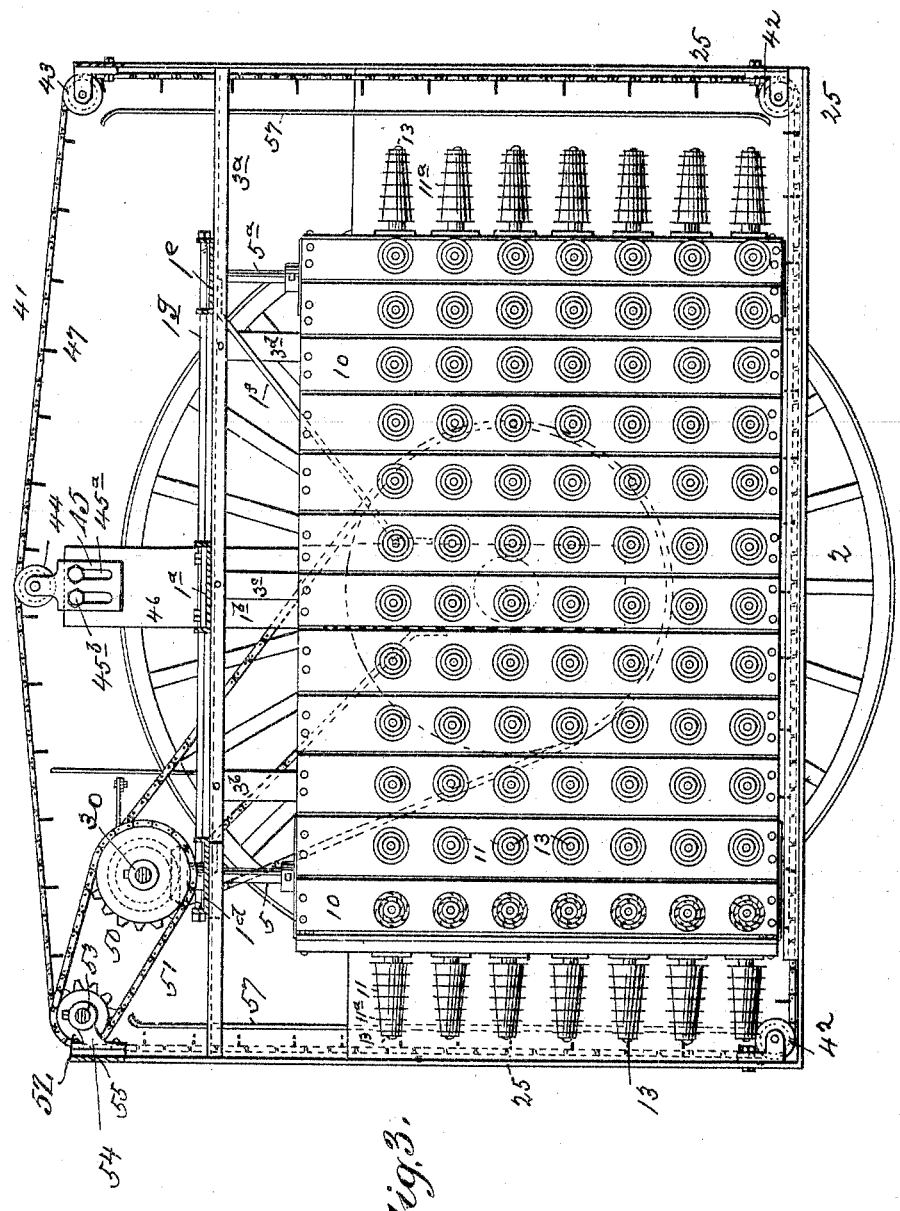
Figure 4:
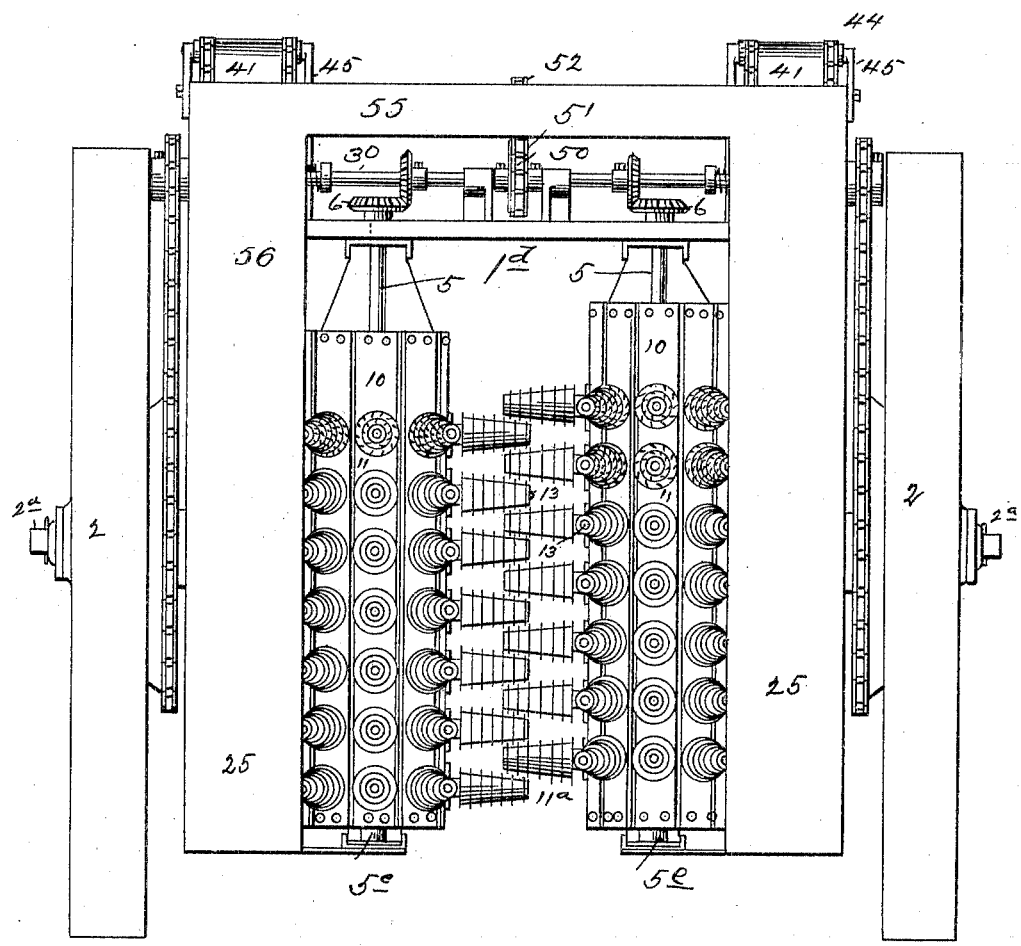
Figure 5:
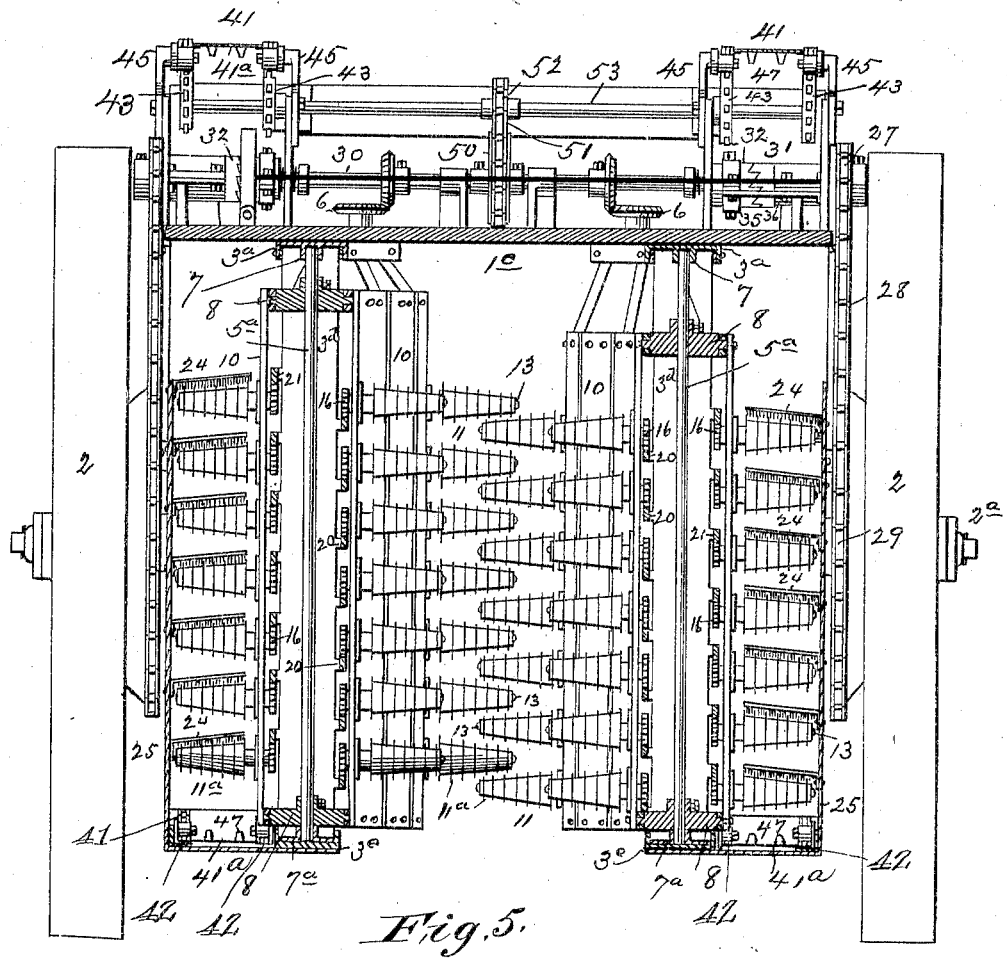
Figure 6:
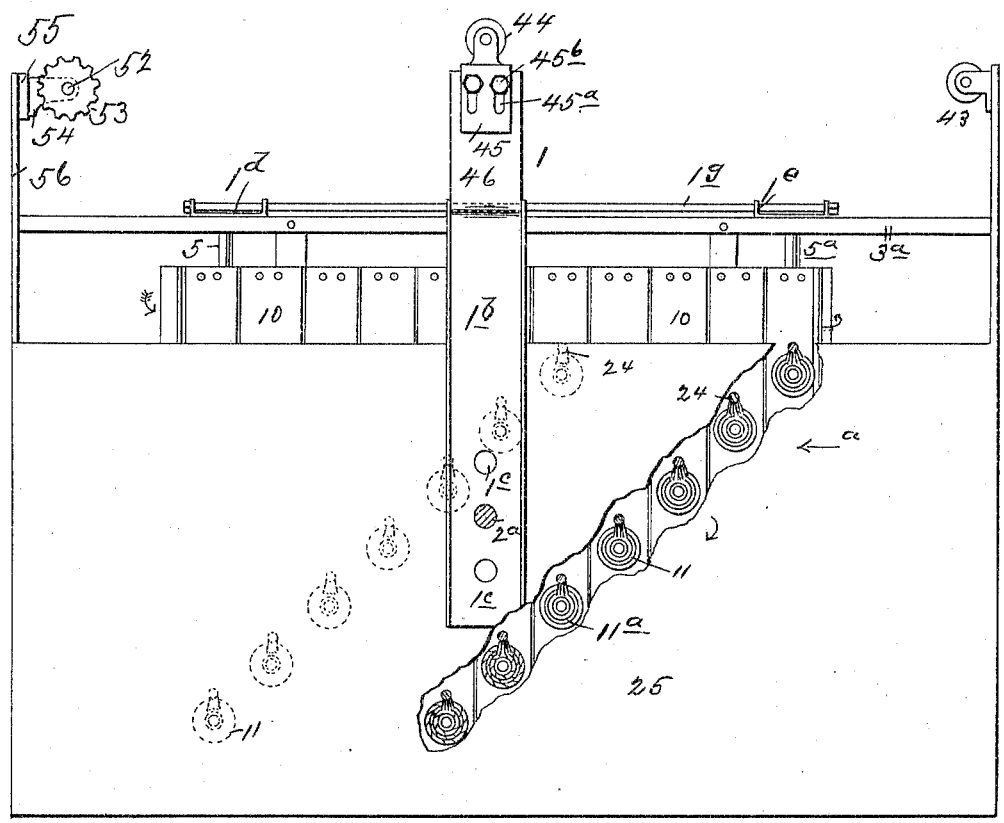
Figure 7:
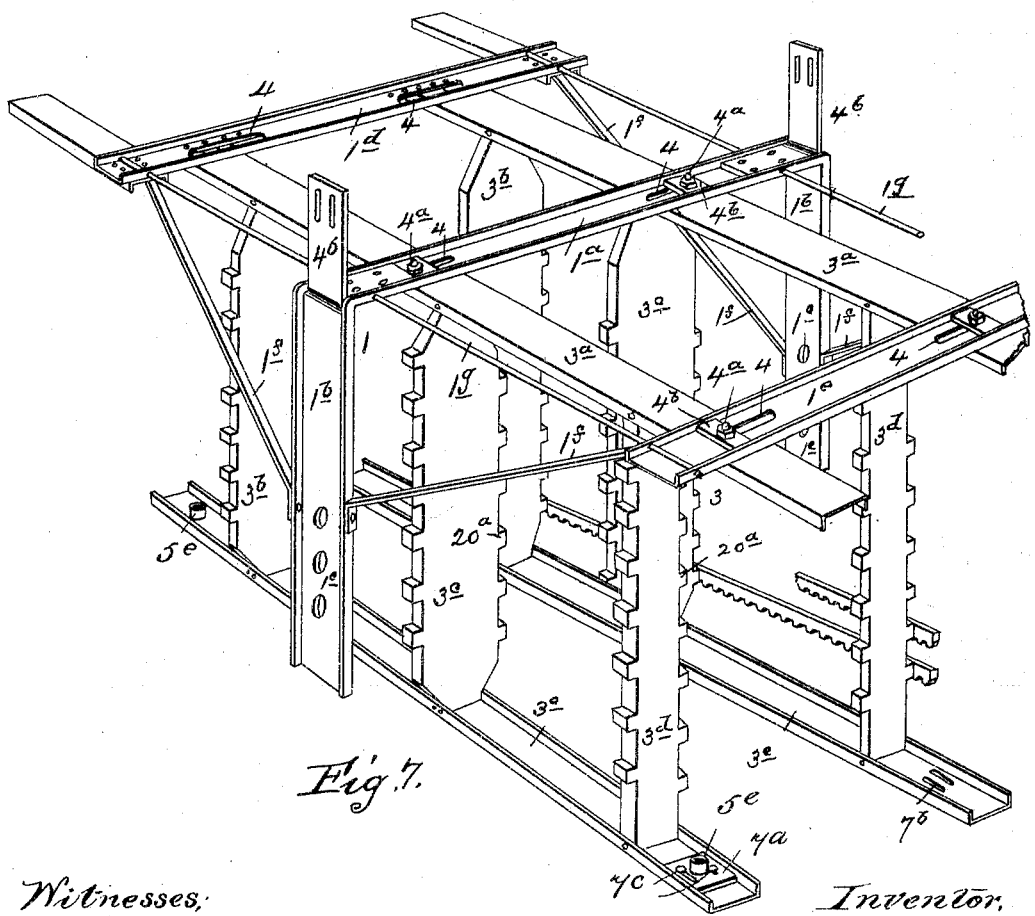
Figure 19:
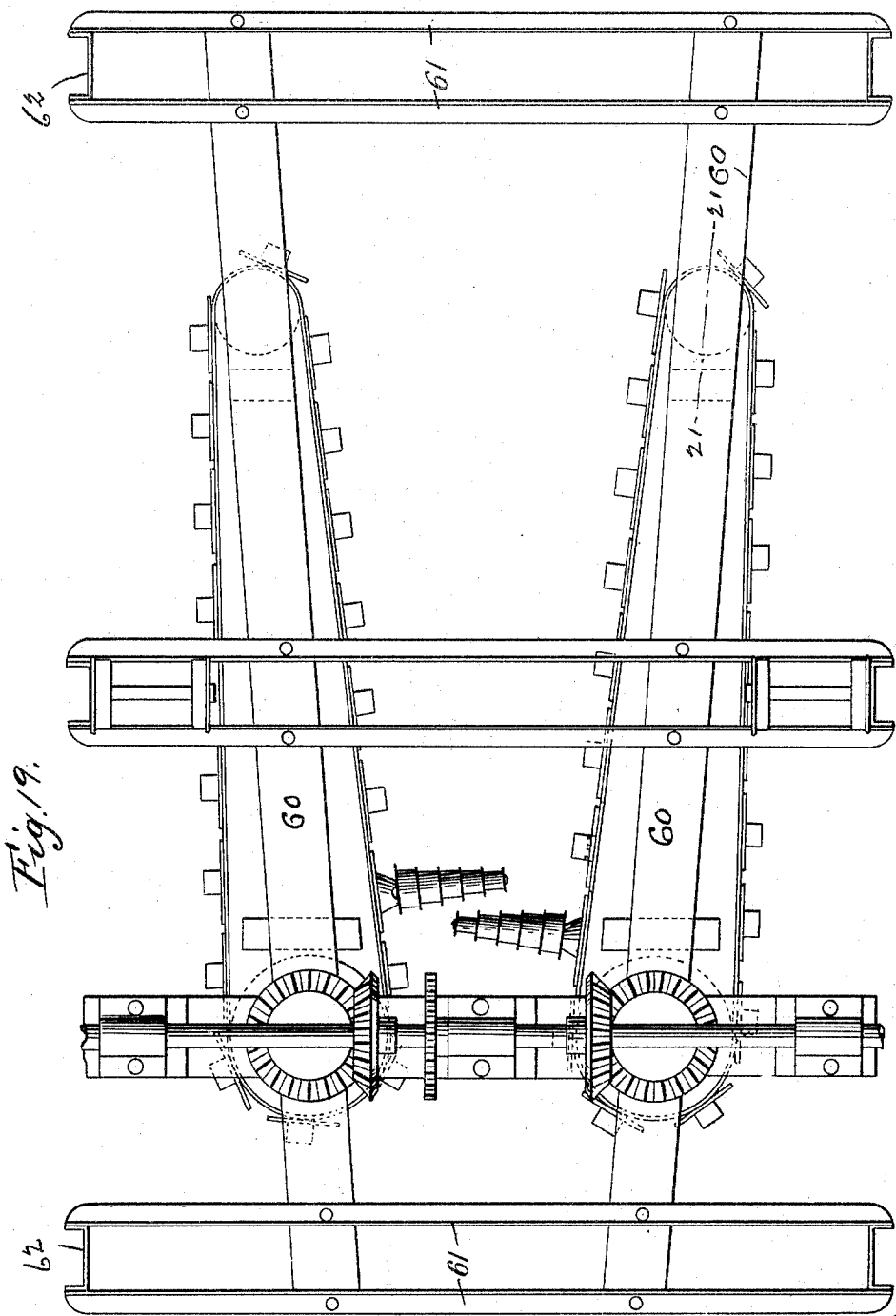
Figure 20:
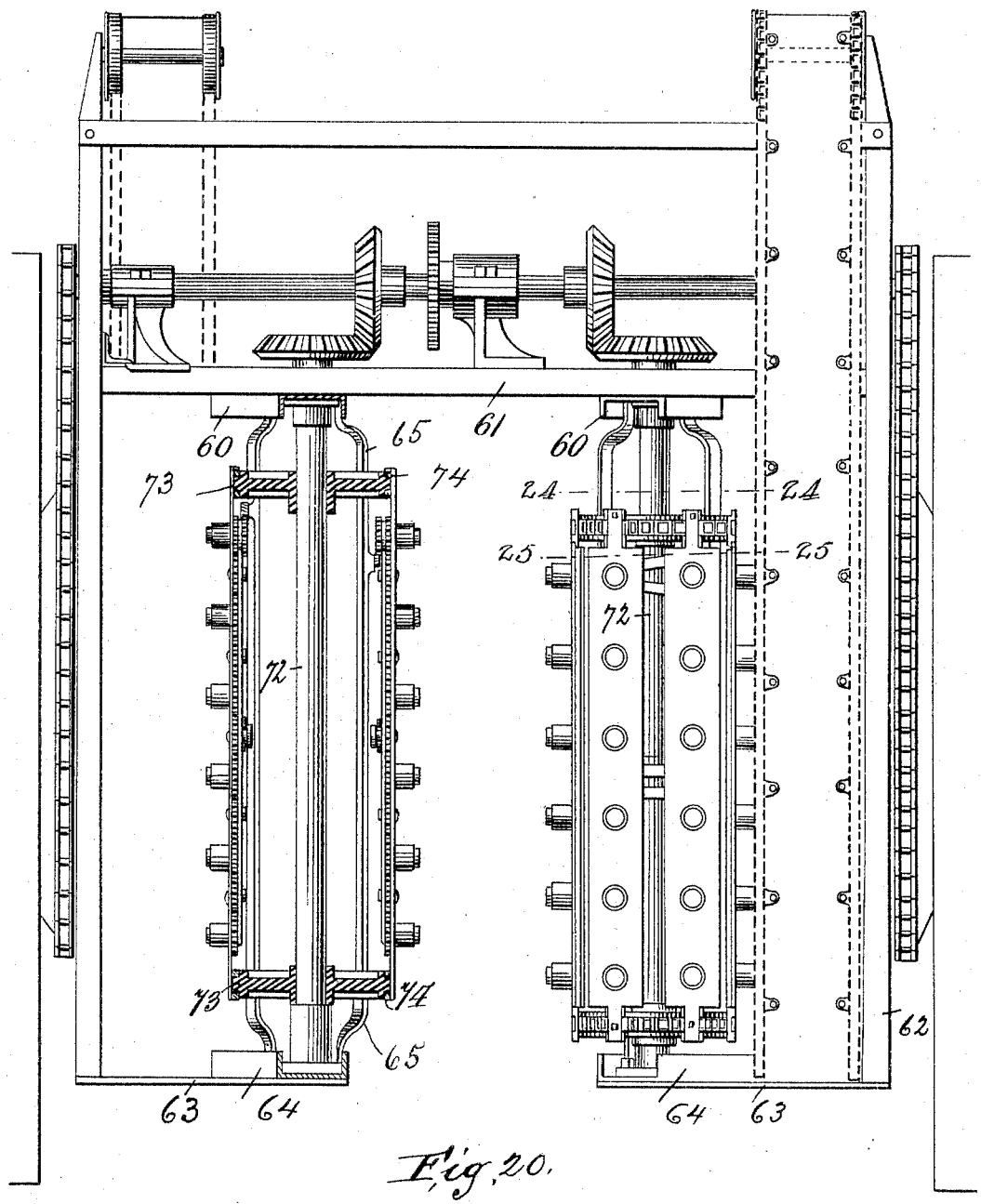
Figure 21:
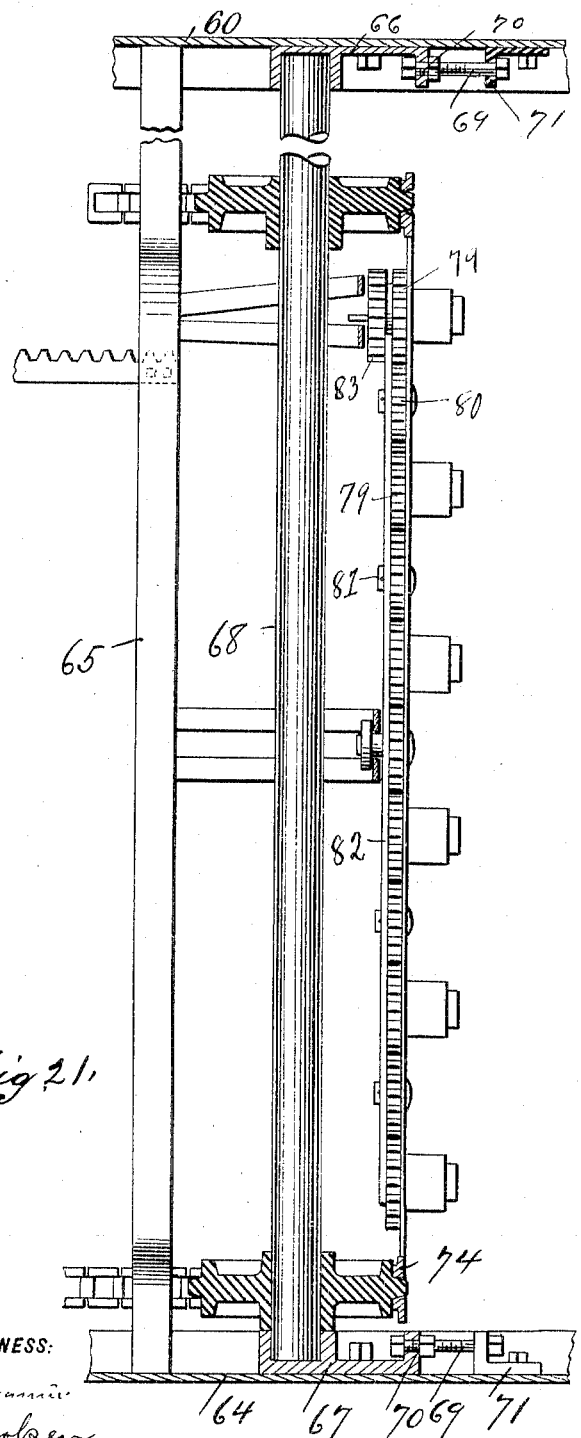
Figure 22:
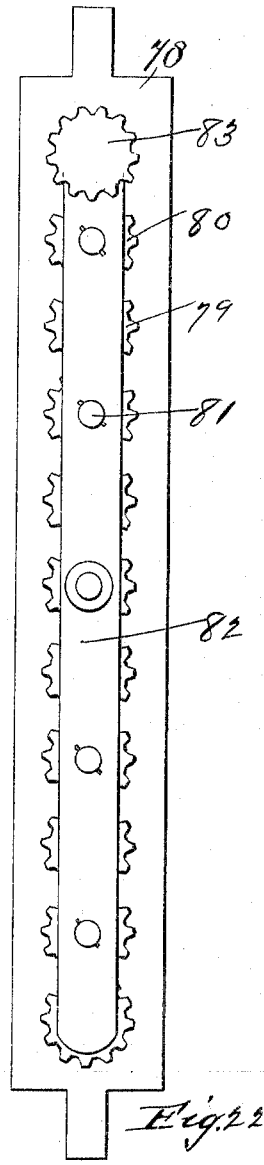
Figure 26:
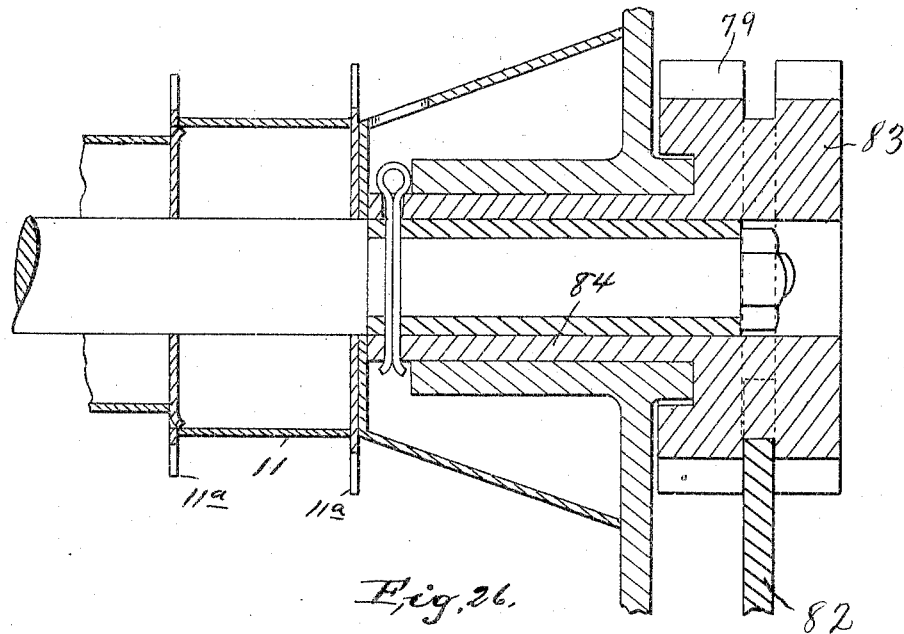
Figure 27:
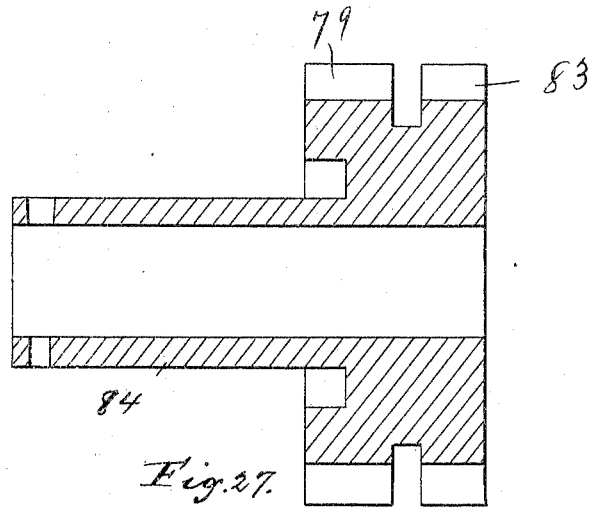

Figure 1 is a side elevation of my improved cotton-harvester complete. Fig. 2 is a partly-broken plan view thereof. Fig. 3 is a vertical longitudinal sectional view on the plane of the line 3 3 in Fig. 2 looking from the left. Fig. 4 is a front elevation of the machine. Fig. 5 is a vertical cross-section of the machine on the plane of the line 5 5 in Fig. 2 looking in the direction of the arrow in Fig. 2. Fig. 6 is a partly-broken side elevation of a portion of the machine, showing an arrangement of combs or brushes for removing cotton from the picker-stems. Fig. 7 is a perspective view showing the main frame and the auxiliary or suspended frame which carries the main operative parts of the machine, also showing the means of adjustment between the two frames and other parts of the machine. Fig. 8 is a vertical detail sectional view, enlarged, showing the means for supporting and operating the picker-stems. Fig. 9 is a longitudinal sectional view, enlarged, of one of the picker-stems. Fig. 10 is a cross-section thereof on the plane of the line 10 10 in Fig. 9. Fig. 11 is a partly-sectional perspective view, enlarged, of one of the picker or hackle saws. Fig. 12 is a detail sectional view showing the supporting-bar for the picker-stem, the means for connecting the latter with the former, the means for rotating the picker-stem and for guiding and supporting the bar as it travels around from the inside to the outer side of the machine. Fig. 13 is a detail plan view showing means for traversing the picker-stems to and fro and for connecting the picker-stem-supporting bars with their supporting and operating chains. Fig. 14 is a substantially similar view in section, showing the rail and rollers for guiding the picker-stem-supporting bars around in line with the operating sprocket-wheel. Fig. 15 is a detail vertical section on the plane of the line 15 15 in Fig. 14. Fig. 16 is a detail sectional view showing a movable connection between the operating-chain and the picker-stem-supporting bar. Fig. 17 is a face view of one of the picker or hackle saws. Fig. 18 is an edge view thereof. Figs. 19 to 27 illustrate a modification, and of this modification Fig. 19 is a top plan view. Fig. 20 is a front view of said modification, partly in section. Fig. 21 is a vertical section looking inwardly on the line 21 21 of Fig. 19. Fig. 22 is a side elevation of one of the picker-stem-carrier bars detached seen from the interior. Fig. 23 is an end view of the picker-stem-carrier mechanism. Fig. 24 is a horizontal section on the line 24 24, Fig. 20. Fig. 25 is a similar section on the line 25 25 of the same figure, and Figs. 26 and 27 are details showing the mode of attachment of the picker-stems to their carriers.

Referring now to the accompanying drawings, in which similar numerals of reference indicate corresponding parts in the several views, the number 1 indicates the main frame of the harvester, which is mounted on suitable wheels 2 2. The main portion of this frame is in substantially the form of a yoke, having a top horizontal cross-bar $1^a$ and depending bars $1^b$ $1^b$ at the ends thereof, as in Fig. 7. The parts $1^a$ $1^b$ are preferably in the form of channel-irons, and the axles $2^a$ of the wheels 2 are connected with the bars $1^b$ $1^b$, whereby the frame is suspended with the cross-bar $1^a$ uppermost. The bar $1^b$ may be provided with a plurality of apertures $1^c$ to receive the axles $2^a$, so that the frame can be raised and lowered relatively to the ground. $1^d$ $1^e$ are horizontal channel-bars connected to the bars $1^b$ by braces $1^f$, and $1^g$ represents the rods connecting the bars $1^a$, $1^d$, and $1^e$, as shown in Fig. 7.

Within the main frame 1 is an auxiliary frame 3, which is suspended from the bars $1^a$ $1^d$ $1^e$. (See Fig. 7.) This auxiliary frame is shown composed of longitudinal bars $3^a$ $3^a$, from which depend uprights $3^b$ $3^c$ $3^d$ on opposite sides of the longitudinal center of the machine, and the lower ends of these uprights are connected in series by longitudinal channel-bars $3^e$, all as clearly shown in Fig. 7. As also shown in said figure, the bars $3^a$ $3^e$ converge toward the front of the machine for a purpose hereinafter set forth.

The auxiliary frame 3 is adjustably connected with the main frame 1 to enable the width of the space between the uprights $3^b$ $3^c$ $3^d$ to be altered, as well as to change the degree of convergence of the longitudinal bars $3^a$ and $3^e$. For this purpose I have shown the bars $1^a$, $1^d$, and $1^e$ as provided with slots 4, which receive bolts or screws $4^a$, that extend from the bars $3^a$, and pass through plates $4^b$, that overlie the slots 4. The slots 4 in bar $1^d$ also serve to allow adjustment of certain shafts, as hereinafter explained.

The auxiliary frame 3 carries the mechanism which operates the picker-stems, and for this purpose at or near opposite ends of the longitudinal bars $3^a$ $3^e$ are journaled vertical shafts 5 and $5^a$, (see Figs. 3 and 4,) and the shafts 5 at the front of the machine are stepped in suitable bearings $5^e$ on the lower bars $3^e$ and project through the upper bars $3^a$ and carry at their upper ends miter-wheels 6, by which they are operated. Adjustable bearings may be provided for the upper ends of the shafts 5, inasmuch as these shafts project through the slots 4 in the cross-bar $1^d$ of the main frame, whereby said shafts can be adjusted laterally with the bars $3^a$. The rear shafts $5^a$ at their upper ends are journaled in suitable bearings 7 of the bars $3^a$, (see Fig. 5,) and at their lower ends said shafts are journaled in adjustable bearings $7^a$, carried by the lower bars $3^e$, these bearings $7^a$ being adjustable longitudinally of the bars $3^e$ by means of slots $7^d$ in said bars, which receive bolts $7^c$. (See Figs. 5 and 7.) The upper bearings for the shafts $5^a$ are preferably similarly arranged; but of course I do not limit my invention to this particular form of means for taking up the slack in the operating-chains. Upon the shafts 5 $5^a$ are secured horizontally-disposed sprocket-wheels 8 near opposite ends of said shafts, around which sprocket-wheels pass endless chains 9. (See Figs. 8, 13, and 14.) The webs of these chains lie horizontal, and they also travel horizontally and are operated by rotation of the shafts 5.

10 represents vertical bars connecting the upper and lower chains 9 in pairs on the respective sides of the machine, these bars 10 carrying the picker-stems.

While the bars 10 may be suitably connected in other ways with the chains 9, I preferably provide the following arrangement: From the intermediate links $9^a$ of the chain 9 project pins or studs 12, which enter apertures $10^a$ in the respective bars 10. (See Figs. 8, 13, and 16.) These studs 12 are threaded at their outer ends and receive nuts $12^a$, which preferably enter countersunk recesses $10^b$ in the outer sides of the bars 10, the apertures $10^a$ being preferably elongated, as shown, to allow the studs 12 to have internal movement therein. (See Fig. 16.) By this means as the vertical bars 10 travel around the sprocket-wheels 8 the bars 10 are permitted proper freedom of movement. (See Figs. 13 and 14.)

The picker-stems 11 are constructed and supported on the bars 10, as follows: $11^a$ represents toothed disks or saws, each having a central aperture $11^b$, preferably square, through which passes a correspondingly-shaped rod or shaft 13. $11^c$ represents guards or tubular rings placed between the adjacent disks or saws $11^a$, which latter are arranged in series of graduated diameters, as clearly shown in Fig. 9, which guards serve to hold the disks 11ª at stated distances apart. The disks or saws 11ª have inwardly-projecting lugs 11ᵈ, against which the guards 11ᶜ rest, as shown in Fig. 9, whereby when the series of guards and disks or saws 11ª are put together they will be retained in their proper relative positions. The lugs 11ᵈ may be struck up from the metal of the disks 11ª, as shown in Fig. 11. The larger or inner disk 11ª of the series of disks or saws rests against the plate 14, which is carried by a guard or shield 14ª, that fits up close to a flange 15ª on a bearing 15, that is bolted to the respective bar 10. (See Fig. 8.) The flange 15ª has apertures 15ᵇ, which receive the bolts 15ᶜ, and the guard 14ª incloses said bolts on the outer side of the bar 10 to prevent cotton and sticks from being caught thereon, although it is evident that the guard 14ª can rest directly against the bar 10 while still protecting the bolt. The plate 14 also has an aperture through which the rod 13 projects. (See Fig. 9.)

16 is a spur-wheel having a tubular projection or sleeve 16ª, which rotates in the bearing 15, and through which the rod 13 passes. (See Fig. 9.) Upon the rod 13 and located within the sleeve 16ª is a bushing or sleeve 13ª, and on the inner end of the rod 13 is a threaded extension 13ᵇ, which receives a nut 13ᶜ, the latter overlying the bushing 13ª and being smaller than the bearing in the sleeve 16ª, as shown in Fig. 9, so that the rod 13 and the bushing 13ª can be pulled through the spur-wheel 16 and the sleeve 16ª when it is desired to remove or replace the picker-stem. At the outer end of the rod 13 is a head or washer 13ᵈ, which rests against the outermost or smallest toothed disk or saw 11ª, so that when the nut 13ᶜ is drawn up the parts 11ª, 11ᶜ, 13, 14, and 13ª will be held in a compact structure. The rod 13, the bushing 13ª, and the sleeve 16ª have alined apertures 17 17ª 17ᵇ, respectively, through which passes a gather-pin 18, as shown in Figs. 9, 10, whereby the sleeve 16ª is connected with the shaft 13 and bushing 13ª, so that they will all rotate together. The guard 14ª has one or more apertures 14, through which a suitable tooth can be inserted to withdraw or adjust the gather-pin 18 when the picker-stem is to be removed or applied to the bar 10. The surface of the sleeve 16ª has a circumferential groove 16ᵇ, and the bearing 15 has a hole 15ᶜ leading from the exterior surface of the bearing to the interior surface thereof and there registering with the groove 16ᵇ and is adapted to receive a pin 19, which will pass into the groove 16ᵇ, and thus hold the parts 16ª 15 together, while still allowing the sleeve 16ª to rotate within the bearing 15. The picker-stem being thus organized into a compact structure can be removed and replaced at any time in accordance with the position with which it is desired to operate relatively to the ripe cotton on the bushes, as well as when it is desired to replace a broken hackle, disk, or saw 11ª. The guard 14ª serves to prevent cotton from winding on the hubs, sleeves, or bearings 15, 16ª, and 13ª and on the pin 18.

The picker-stems 11 are or may be arranged in vertical rows of any number of stems on the bars 10, as shown in Figs. 3 and 4, and as the surfaces of the picker-stems are substantially cone-like the opposing series of picker-stems are enabled to pass each other at the central portion of the machine, while the spaces between the corresponding picker-stems are practically closed, as shown in Fig. 4.

It will be understood that there are a set of endless chains, upright bars 10, and picker-stems 11 on each side of the machine, as shown in Figs. 2, 4, and 5, and the two sets of endless carriers converge toward the front of the machine, as shown in Fig. 2, so that the cotton-bushes will be met by a vertical wall of picker-stems, which are close together, with no space between the inner ends of them, as shown in Fig. 4, and that owing to the rearward divergence of these endless carriers the picker-stems will have a lateral motion relatively to the cotton-bush while in contact therewith, for the reason that as the harvester travels forwardly the picker-stems will be carried rearwardly at about the same speed that the machine travels forwardly. By this means while the stems are in contact with the bush and the machine is traveling forwardly the rearward line of divergence of the picker-stems causes them to move laterally or across the bush while in contact therewith, so that when the harvester has passed from a bush the latter will be practically freed from the picker-stems, owing to the distance between the stems at the back of the machine, as shown in Fig. 2.

The picker-stems are caused to rotate while in contact with the cotton-bushes to pick the cotton from the bolls, as follows: 20, Figs. 5 and 8, represents racks having their teeth extending upwardly and located along the inner portion of the machine parallel to the inner surface of the upright bars 10, upon which racks the spur-wheels 16 are adapted to travel, so that as the bars 10 are carried along the wheels 16 will rotate, and thereby will turn the corresponding picker-stems in the proper direction to pick the cotton from the bolls. There is one rack 20 for each horizontal row of picker-stems, and these racks are carried by the uprights 3ᵇ 3ᶜ 3ᵈ, which uprights have horizontal projecting lugs 20ª, to which these racks are connected, whereby the spur-wheels 16 have freedom of movement relatively to the uprights 3ᵇ 3ᶜ 3ᵈ. (See Fig. 12.)

To further regulate the degree of divergence between the inner walls of the picker-stem carriers 9 10, the rear sprocket-wheels 8 may be of less diameter than the forward sprocket-wheels and so set that a line drawn through the peripheries of the corresponding forward and rearward sprocket-wheels on the outer sides shall be parallel, or nearly so, to the frame of the machine, while the lines drawn through the peripheries of the corresponding sprocket-wheels on the inner sides shall converge relatively to each other toward the front of the machine. With this arrangement also the width of the bars $3^b$ $3^c$ $3^d$ would vary, as shown in Fig. 7.

After the picker-stems have rotated in one direction to pick the cotton from the bolls and as they are carried around to travel forwardly on the outer sides of the machine they are caused to rotate reversely by means of racks 21, carried by the bars $3^b$ $3^c$ $3^d$, said racks being adapted to engage the spur-wheels 16; but these racks are inverted and overlie said spur-wheels, as shown in Fig. 5, the operation of which will be readily understood.

In order to properly assist in sustaining the bars 10 and to guide them as they travel around the peripheries of the sprocket-wheels 8 8, I provide rails 22, which are curved in line with the sprocket-wheels on a circle described around the axis of said wheels, as shown in Fig. 14, which rails are supported by the forward and rearward uprights $3^b$ $3^c$ $3^d$. By preference these rails 22 are arranged in pairs, as shown, and receive between them rollers 23, which are journaled on studs 24, carried by the bars 10 and projecting from the inner surfaces thereof. (See Figs. 12, 15.) By this means the studs 12 are relieved from the strain of sustaining the bars 10 as they travel around the sprocket-wheels 8.

As the picker-stems travel forwardly on the outer sides of the machine after they have gathered the cotton from the bushes they are relieved of the cotton, and for this purpose I have shown a series of combs 24, which project inwardly over the picker-stems from the side walls or casings 25, which are suitably supported by the framework of the machine. While there could be one of such combs 24 used for each picker-stem, I have devised a plan to reduce the number of such combs, at the same time effectually removing the cotton from the picker-stems. For this purpose I arrange the combs 24 in two diagonal rows, as shown in Fig. 6, whereby each picker-stem will be acted upon by only two combs 24, one forwardly of the other. The line of inclination of these combs is from the forward end of the machine rearwardly, so that as the picker-stems are carried forwardly on the outer side of the machine in the direction of the arrow $a$ in Fig. 6 the cotton that is disengaged from the upper row of the picker-stems by the first comb 24 will drop below, and should it be caught by any one of the lower picker-stems it will be carried to the comb corresponding to that stem and removed thereby, and so on, and, furthermore, should any be carried beyond a comb of the rearward series it will be caught by the corresponding comb of the next forward-inclined series of combs and by it disengaged from the picker-stem. By this means the power required to disengage the cotton from the picker-stems is greatly reduced from what would be necessary were a comb provided for each picker-stem of the machine.

Any suitable means may be provided for operating the picker-stem carriers, or, in other words, for operating the endless chains and their uprights or bars 10. I have shown short shafts 26, journaled in suitable bearings on the main frame and provided with the sprocket-wheels 27, over which pass chains 28 from the sprocket-wheels 29, connected with the wheels 2.

30 is a horizontal shaft on the cross-bar $1^d$ of the main frame, which is adapted to be rotated by and with the shaft 26. For this purpose the shaft 26 has connected with it a toothed rim or portion of a clutch 31, which is adapted to be engaged by a toothed clutch-sleeve 32, mounted on the shaft 30 and connected therewith by the usual key and groove or slot to permit it to slide on said shaft, while causing said shaft to rotate with it. This clutch 32 is shown held in engagement with the clutch portion 31 by means of a spring 33 around on the shaft 30 and bearing against a collar 34, carried by said shaft.

35 represents levers pivotally carried by brackets 36 on the bar $1^d$, said levers being connected by a bar 37 so that they will move toward and from each other in unison. The levers may be operated by suitable means, as by a hand-lever 38, suitably pivoted upon the frame.

Upon the shaft 30 are secured miter-wheels 40, which mesh with the miter-wheels 6, so that when the clutches 31 32 are in engagement the shafts 5 5 can be rotated and when said clutches are disengaged said shafts will remain stationary.

In order to carry the cotton away from the picker-stems when it has been removed therefrom by the combs 24, I provide a suitable elevator or conveyer, which is arranged and operated as follows: The casing 25 on each side of the machine is provided with an inwardly lower web or floor portion which projects under the outer series of picker-stems and may be connected to the longitudinal bars $3^e$, (see Fig. 5,) which will also assist in supporting the casing on the framework of the machine, the casing inclosing the sides and ends of the machine, as shown more clearly in Figs. 1, 3, and 5. 41 is an endless conveyer or elevator which travels along the lower web or floor of the casing 25 beneath the outer series of picker-stems, passing under the sprocket-wheels 42, arranged in pairs at the lower corners of the casing, and passing over the upper sprocket-wheels 43, similarly arranged at the upper corners thereof and guided midway of the machine at the top by similarly-spaced guide sprocket-wheels 44. These sprocket-wheels 44 are shown carried by blocks or bearings 45, adjustably mounted on uprights 46, extending from the sides $1^b$ of the main frame. These blocks 45 are shown provided with slots $45^a$, which receive bolts $45^b$ to permit adjustment.

The elevator 41 consists of two parallel endless chains connected by a suitable webbing $41^a$, (see Fig. 5,) from which project fingers 47, which serve to carry the cotton along and upwardly as it drops from the picker-stems. The cotton drops from the carrier as it passes along over the top of the machine and falls upon a suitable platform or receptacle. Afterward from each platform it can be gathered, as desired.

The elevator 41 may be operated as follows: Upon the shaft 30 is a sprocket-wheel 50, over which passes a suitable chain 51, which engages a sprocket-wheel 52 on a horizontal shaft 53, journaled in suitable bearings 54, carried by cross-bars or supports 55, supported by uprights 56, extending up from the casing 25. (See Figs. 3, 4, and 5.) On the shaft 53 are secured the sprocket-wheels 43 at the forward part of the machine, over which the chains of the carrier 41 pass (see Figs. 2 and 5) and by which said chains are operated.

It will be understood that when the clutches 31 32 are in engagement the picker-stem carriers and cotton-carriers 41 will be operated simultaneously and when said clutches are separated said carriers will cease to operate.

57 represents vertical plates or guides arranged parallel to the front and rear walls of the shield 25. Between each plate and shield the cotton-carrier 41 travels, as in Fig. 3, whereby the cotton is held upon the carrier as it rises to the top of the machine, the parts 25 57 thereby forming a chute or channel for the passage of the cotton.

In the modification illustrated in Figs. 19 to 27 to the ends of the upper longitudinal bars 60 are riveted angle-irons 61, which are joined to the ends in pairs by the channel-irons 62, from the lower ends of which extend inwardly the plates or bars 63, upon which are secured the lower longitudinal bars 64. Said bars 64 are also suspended from the bars 60 by hangers 65. 66 represents upper and 67 lower bearings for the vertical rear shafts 68, as shown in Fig. 21, and these bearings are made adjustable longitudinally on the bars 60 64 by means of the screw-bolts 69, working in threaded extensions 70 of said bearings, and at the other end being held in brackets 71, fixedly secured to said bars 60 64. By this means the distance of the rear vertical shafts 68 from the forward vertical shafts 72 can be varied as desired and the chains carrying the picker-stems tightened or slackened, as desired. 73 represents the sprocket-wheels on the shafts 72, and 74 the upper and lower sprocket-chains carried thereby. As illustrated in Fig. 24, said chains are provided at regular intervals with lay-links 75, in which are secured clamps 76, clamping the reduced ends 77 of the picker-stem bars 78. Said bars carry each a series of gears 79, actuated in series by intermediate gears 80, said gears being held in place by bolts 81, passed through the bar 78, and a rear plate 82. Said gears are all actuated by means of a gear 83, which is adapted to be operated as the picker-stem carriers are moved along by engagement with upper or lower racks, as have been before described. As shown in Figs. 26, 27, the upper gear 79 and the gear 83 can be made in one piece on a sleeve 84, secured to the picker-stem by a pin, as has already been described.

Having now described my invention, what I claim is—

1. In a cotton-harvester, the combination with a main frame comprising a horizontal bar and vertical depending bars secured thereto, of an auxiliary frame adjustably suspended within said main frame, said auxiliary frame including a pair of rearwardly-diverging members, substantially as described.

2. In a cotton-harvester, the combination with a main frame, of an auxiliary frame adjustably suspended within said main frame, said auxiliary frame comprising a pair of horizontally-disposed rearwardly-diverging members, and uprights supporting said diverging members, substantially as described.

3. In a cotton-harvester, the combination with a main frame comprising parallel slotted horizontal bars and vertical depending bars, of an auxiliary frame adjustably suspended within said main frame, said auxiliary frame comprising two pairs of horizontally-disposed rearwardly-diverging members, and uprights connecting the corresponding members of each pair, substantially as described.

4. The combination of a yoke-like main frame having upper horizontal bars and vertical depending bars connected with the central one of said horizontal bars, with an auxiliary frame consisting of two portions, each portion having an upper and lower longitudinal bar, and intermediate uprights connecting them, and braces extending from the vertical side bar of the main frame to the horizontal end bars thereof, substantially as described.

5. The combination of a yoke-like main frame having upper horizontal bars and vertical depending bars connected with the central one of said horizontal bars, with an auxiliary frame consisting of two portions, each portion having an upper and lower longitudinal bar, and intermediate uprights connecting them, and braces extending from the vertical side bar of the main frame to the horizontal end bars thereof, and means for adjusting the separate portions of said auxiliary frame laterally, substantially as described.

6. A main frame composed of a transverse bar, having depending vertical bars, and transverse end bars, braces connecting said end bars with said vertical bars and tie-rods connecting said horizontal bars, combined with an auxiliary frame consisting of two portions, each portion having an upper and lower horizontal bar extending lengthwise of the machine and connected by uprights, means for suspending the upper longitudinal bars of the auxiliary frame from the horizontal bars of the main frame, and means for adjusting the portions of said auxiliary frame laterally, substantially as described.

7. The combination of a main frame having horizontal bars and uprights at the outer ends thereof, with an auxiliary frame consisting of two portions having horizontal longitudinal bars connected by uprights, said auxiliary frame being suspended from the horizontal bars of the main frame, with vertical shafts carried near opposite ends of said longitudinal upper and lower bars, sprocket-wheels carried by said shafts at their upper and lower portions, endless chains passing over said sprocket-wheels, vertical bars connected with the upper and lower parallel chains on each side of the machine, rotative picker-stems carried by said vertical bars, means for traversing said endless chains and means for rotating said picker-stems as they are carried along by said chains, substantially as described.

8. The combination of a main frame having horizontal bars and uprights at the outer ends thereof, with an auxiliary frame consisting of two portions having horizontal longitudinal bars connected by uprights, said auxiliary frame being suspended from the horizontal bars of the main frame, with vertical shafts carried near opposite ends of said longitudinal upper and lower bars, sprocket-wheels carried by said shafts at their upper and lower portions, endless chains passing over said sprocket-wheels, vertical bars connected with the upper and lower parallel chains on each side of the machine, rotative picker-stems carried by said vertical bars, means for traversing said endless chains and means for rotating said picker-stems as they are carried along by said chains, and means for adjusting the longitudinal bars of said auxiliary frame laterally toward and from each other, so as to adjust the picker-stems on opposite sides of the machine nearer to and farther from each other, substantially as described.

9. The combination with a frame composed of two side portions, the forward ends of said portions being inclined toward each other, picker-stems carried by each portion of said frame in such position that they will overlap or intermingle with each other at the forward end of the machine, means for moving said picker-stems rearwardly on diverging lines, and means for rotating said picker-stems during their rearward travel, whereby said picker-stems present a vertical wall to a cotton-bush and move outwardly relatively thereto while in contact therewith, substantially as described.

10. The combination of a main frame with an auxiliary frame carried thereby, and composed of two independent side portions, the forward ends of said portions being inclined toward each other, picker-stems carried by each portion of said auxiliary frame in such position, that they will overlap or intermingle with each other at the forward end of the machine, means for moving said picker-stems rearwardly on diverging lines, and means for rotating said picker-stems during their rearward travel, whereby said picker-stems present a vertical wall to a cotton-bush and move outwardly, relatively thereto while in contact therewith, substantially as described.

11. In a cotton-harvester, the combination with a main frame comprising an upper horizontal bar, and a pair of vertical bars depending therefrom, of an auxiliary frame adjustably suspended therefrom, including a pair of horizontally-disposed rearwardly-diverging members, adjustable in relation to each other, intermediate uprights, supporting said diverging members, rack-bars carried by said uprights, picker-stems carried by said auxiliary frame, and gearing carried by said auxiliary frame for operating said picker-stems, substantially as described.

12. In a cotton-harvester, the combination with a main frame, of an auxiliary frame adjustably supported by said main frame, said auxiliary frame including a pair of horizontally-disposed rearwardly-diverging members, means for adjusting the relative positions of said diverging members, rack-bars carried by said auxiliary frame, picker-stems adapted to travel upon said auxiliary frame, pinions carried by said picker-stems adapted to mesh with said rack-bars, and mechanism for carrying said picker-stems, substantially as described.

13. In a cotton-harvester, the combination with a main frame, of an auxiliary frame adjustably supported by said main frame, said auxiliary frame including a pair of rearwardly-diverging members, means for adjusting the relative positions of said diverging members, intermediate uprights supporting said diverging members, rack-bars carried by said uprights, gearing carried by said auxiliary frame, and a plurality of picker-stems operated by said gearing and rack-bars, substantially as described.

14. In a cotton-harvester, the combination with a main frame comprising a horizontal bar and vertical bars supported thereby, of an auxiliary frame, including a pair of rearwardly-diverging members carried thereby, sprockets mounted in said auxiliary frame at each end of said diverging members, endless chains passing over said sprockets, and picker-stems carried by said endless chains, substantially as described.

15. In a cotton-harvester, the combination with a yoke-like main frame, of an auxiliary frame supported by said main frame, including a pair of oppositely-disposed rearwardly-diverging members, said members being separately adjustable on said main frame, sprockets carried by said auxiliary frame, rack-bars also carried by said auxiliary frame, endless chains passing over said sprockets, cross-bars carried by said endless chains, picker-stems journaled in said cross-bars, and gearing carried by said picker-stems adapted to mesh with said rack-bars, substantially as described.

16. In a cotton-harvester, the combination with a yoke-like main frame, of an auxiliary frame suspended from said main frame, a pair of rearwardly-diverging members secured to said auxiliary frame, means for adjusting the relative positions of said members, sprockets carried by said diverging members, endless chains passing over said sprockets, cross-bars carried by said endless chains, picker-stems rotatably mounted upon said cross-bars, and mechanism for rotating said picker-stems, substantially as described.

17. A picker-stem composed of a rod, a series of toothed disks or saws through which said rod passes, said disks or saws gradually increasing in diameter from the outer end of the rod to the other end, intermediate cylindrical guards interposed between said disks or saws, studs on the disks for centering the guards on the rod, and means for holding said disks or saws and said guards firmly upon said rod, substantially as described.

18. A picker-stem composed of a rod, a series of toothed disks or saws through which said rod passes, a series of guards located between said toothed disks or saws, a bushing on said rod, and means for holding said toothed disks or saws and said guards rigidly upon said rod, combined with a toothed wheel having a sleeve in which said bushing is journaled, and a pin or cotter fastened through apertures in said sleeve, bushing and rod, whereby said bushing and rod can be withdrawn from said wheel and sleeve, and a bearing in which said sleeve can rotate, substantially as described.

19. A picker-stem composed of a rod, a series of toothed disks or saws through which said rod passes, a series of guards located between said toothed disks or saws, a bushing on said rod, and means for holding said toothed disks or saws and said guards rigidly upon said rod, combined with a toothed wheel having a sleeve in which said bushing is journaled, and a pin or cotter fastened through apertures in said sleeve, bushing and rod, whereby said bushing and rod can be withdrawn from said wheel and sleeve, and a bearing in which said sleeve can rotate, and means for holding said bearing and sleeve in proper rotative position relatively to each other, substantially as described.

20. A picker-stem composed of a rod, a series of toothed disks or saws through which said rod passes, a series of guards located between said toothed disks or saws, a bushing on said rod, and means for holding said toothed disks or saws and said guards rigidly upon said rod, combined with a toothed wheel having a sleeve in which said bushing is journaled, and a pin or cotter fastened through apertures in said sleeve, bushing and rod, whereby said bushing and rod can be withdrawn from said wheel and sleeve, and a bearing in which said sleeve can rotate, an annular groove in the periphery of said sleeve and a pin carried by said bearing and located in said groove, whereby said sleeve can rotate in said bearing, substantially as described.

21. The combination of a supporting-rod, a series of toothed disks or saws, a series of guards located between said disks or saws, a bushing carried by said rod, a sleeve connected with said bushing and a bearing for said sleeve with a guard surrounding said sleeve and bearing, substantially as described.

22. The combination of a supporting-rod, a series of toothed disks or saws, a series of guards located between said disks or saws, a bushing carried by said rod, a toothed wheel having a sleeve within which said bushing is located, a pin or cotter passing through apertures in said sleeve, bushing and rod, and a bearing for said sleeve combined with a guard surrounding said bearing and pin or cotter, said guard having an aperture with access to said pin or cotter, substantially as described.

23. The combination of a supporting-rod, a series of toothed disks or saws, a series of guards located between said disks or saws, a bushing carried by said rod, a toothed wheel having a sleeve within which said bushing is located, a pin or cotter passing through apertures in said sleeve, bushing and rod, and a bearing for said sleeve combined with a guard composed of an annular plate, having a circumferentially-disposed flange portion provided with an aperture, and adapted to inclose said bearing and pin or cotter, substantially as described.

24. The combination of a supporting-rod, a series of toothed disks or saws carried thereby, a series of guards located between said disks or saws, a bushing carried by said rod, and means for uniting said bushing, rod, disks and guards into a rigid structure, a toothed wheel having a sleeve in which said bushing can rotate, the pin or cotter located in apertures in said sleeve, bushing and rod, a bearing for said sleeve having an annular extension provided with apertures to receive bolts, and a guard provided with an aperture, said guard lying between said extension and an adjacent disk or saw and inclosing said pin or cotter, and a bearing, substantially as described.

25. A picker-stem composed of a rod having an angular surface, a series of toothed disks or saws having apertures corresponding to and coacting with the surface of said rod and mounted thereon, said disks or saws having lateral projections, a series of guards located between said toothed disks or saws, and engaging said projections, whereby said guards are held in position, a bushing having an aperture corresponding to the surface of said rod, and mounted thereon, and means for holding said bushing and said disks or saws and the guards rigidly upon said rod in combination with the toothed wheel having a sleeve to receive said bushing, means for connecting said bushing with said sleeve, a bearing within which said sleeve can rotate, and a guard located adjacent said bearing and inclosing the inner end of said bearing to keep the cotton from winding thereon, substantially as described.

26. In a cotton-harvester, the combination of a main frame, and endless carriers supported thereby, means for operating said carriers, picker-stems arranged in series and carried by said carriers, means for rotating said picker-stems, and a series of combs located over the corresponding picker-stems and arranged in an upwardly rearwardly extending diagonal row, adapted to remove the cotton from said picker-stems, substantially as described.

27. In a cotton-harvester, the combination of a main frame, an endless carrier supported thereby, means for operating said carrier, a series of rotative picker-stems supported by said carrier on horizontal lines, and also arranged in upwardly rearwardly extending rows, and a series of combs located over said picker-stems and arranged in an upwardly rearwardly inclined row, adapted to engage said picker-stems to disengage cotton therefrom, substantially as described.

28. In a cotton-harvester, the combination with a yoke-like main frame, an auxiliary frame suspended from said main frame, including a pair of rearwardly-divergent members, sprockets carried by said divergent members, endless carriers passing over said sprockets, cross-bars connecting said carriers, picker-stems carried by said bars, means for rotating said picker-stems, a casing partially surrounding said carriers, and endless elevators passing through said casing, substantially as described.

29. In a cotton-harvester, the combination with a yoke-like main frame, an auxiliary frame suspended therefrom, including a pair of rearwardly-divergent members, gearing carried by said members, endless carriers passing over said gearing, cross-bars connecting said endless carriers, a plurality of rotating picker-stems mounted upon each of said cross-bars, a casing partially surrounding said divergent members, and endless carriers passing through said casing, substantially as described.

Signed at the city of New York, county of New York, and State of New York, this 7th day of August, 1896.

GEORGE LISPENARD.

Witnesses:
JOSEPH L. LEVY,
B. S. WISE.